Sept. 29, 1964  H. S. KACHLINE  3,150,686
LINEAR PNEUMATIC PRESSURE DIVIDER
Filed Dec. 15, 1961

INVENTOR
Harold S. Kachline

BY *Herbert M Birch*

ATTORNEY

United States Patent Office 3,150,686
Patented Sept. 29, 1964

3,150,686
LINEAR PNEUMATIC PRESSURE DIVIDER
Harold S. Kachline, Norristown, Pa., assignor to Robertshaw Controls Company, Richmond, Va., a corporation of Delaware
Filed Dec. 15, 1961, Ser. No. 159,646
7 Claims. (Cl. 137—608)

The present invention relates to a linear pneumatic pressure divider and more particularly to a device adapted to provide a variable pressure output from a constant pressure source.

The principal object of this device is to provide a simple means of producing an output pressure which is directly proportional to a linear mechanical displacement.

Another object is to provide a pneumatic device with a sliding means for variable pressure output control, which requires no seals such as usually required.

Yet another object is to provide a novel linear pneumatic pressure divider, whereby the pressure gradient remains unchanged as the sliding member is repositioned.

Yet another object of this device is to provide a novel construction, whereby a very low force is required to actuate the device and whereby the device operates effectively on both pressure and vacuum supply.

With these and other objects in view which will become apparent as the invention is fully understood, the same resides in the novelty of construction, combination and arrangement of elements hereinafter described in detail and distinctly claimed in the appended claims.

Figure 1:
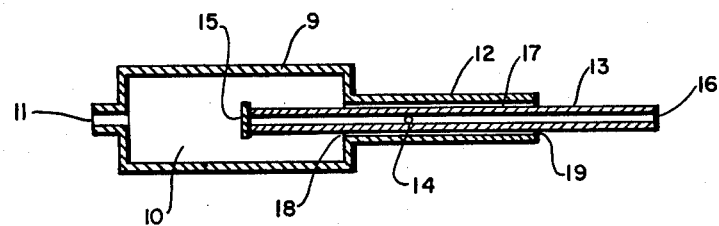
Figure 2:
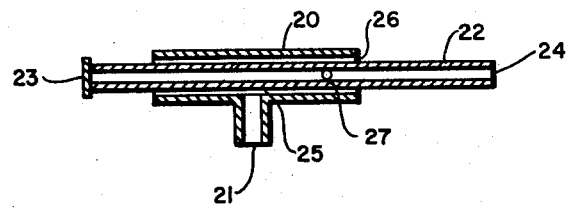

The description should be read in conjunction with the accompanying drawing, wherein:

FIGURE 1 is a longitudinal cross section view of one embodiment of the invention; and FIGURE 2 is a longitudinal cross section view of a second embodiment of the invention.

In the drawing in which like characters of reference designate like or similar elements, the apparatus of FIGURE 1 consists of a housing 9 having a chamber 10. The housing 9 is formed on one end with a supply port 11 and at the opposite end with an elongated tubular extension 12.

Concentrically positioned within the first tubular extension 12 is a second relatively longer tubular member hereinafter called the slider tube 13 formed intermediate its length with a pick-off orifice 14. The slider tube 13 is movable in the housing 9 and chamber 10 and within the first tubular member 12. The end of the second tubular member within the housing chamber is sealed by a disc 15, while the opposite end of the slider tube 13 projects beyond the end of the tubular member 12 and terminates in an output port 16.

The second tubular member or slider tube 13 is of a predetermined smaller exterior diameter than the interior bore of the first tubular member 12 to provide an annular pressure gradient chamber or clearance gap 17, which terminates in an exhaust port 19 opening to atmosphere.

The housing 9 connects to the tubular extension 12 to provide a junction point 18, which as explained hereinafter under the heading "Operation," serves as a reference point for the value of the supply pressure with respect to the position of the movable pick-off orifice 14, by which the transmitted pressure to output port 16 of the second tubular member 13 is controlled or varied. The slider tube 13 is slidable within the first tubular member 12 of the housing 9, to thus regulate or vary the transmitted source pressure from the intake point 18.

FIGURE 2 is a second embodiment of the present invention, wherein the housing 9 is eliminated and a cylinder 20 is provided with a supply port 21 formed therefrom extending perpendicular to the housing in the form of a T-coupling arrangement. In this embodiment a slider member, such as a tube 22 extends through the cylinder 20 at the top of the T and projects from the cylinder into the atmosphere at each end thereof. One end of the slider tube 22 is sealed by a disc 23 and the opposite end is open to provide an output port 24 connectable to any suitable receiver, not shown.

The slider tube 22 is formed intermediate the ends with a pick-off orifice 27, which as in embodiment one is referenced with respect to a constant pressure input point 25 at the junction of the supply port 21 to the cylinder 20.

Operation

Each of the foregoing embodiments function substantially the same during use by the linear adjustment of their respective slider tubes, whereby the pick-off orifice of the slider is moved relative to the supply port to cause change in the output. This operation is much the same as a commonly known electrical potentiometer. For example, with reference to embodiment one, supply pressure is admitted to the chamber 10 at supply port 11. Air then passes from chamber 10 through the clearance gap or annular space 17 between the exterior of slider tube 13 and the bore of the tubular member 12, beginning at constant pressure supply point 18 and exhausting at annular exhaust opening 19.

Thus, it can be readily seen that a pressure gradient exists along the clearance gap 17, beginning with supply pressure at point 18 and dropping to atmospheric pressure at the annular outlet 19.

If a receiving device, not shown, is connected to output port 16 of slider tube 13, the transmitted pressure or the pressure within the tubular slide member 13 will be a function of the position of the pick-off orifice 14 along the clearance gap 17.

For example, if the orifice is located at point 18, the transmitted or output pressure at output port 16 will be the same as that of the supply pressure at supply or intake port 11. The transmitted pressure from point 18 at the constant pressure supply will decrease as the pick-off orifice 14 is slidably positioned nearer the annular exhaust port 19.

Embodiment two functions in the same manner except that the piston effect of the first embodiment is eliminated, since the slider member extends through the top section of the T-coupling forming the supporting supply tube or cylinder 20 and both ends of the slider are subjected to atmospheric pressure.

Without further description it is believed that the many advantages of the present invention over the prior art are apparent and while only two embodiments of the same are illustrated, it is to be expressly understood that the same is not limited thereto as various changes may be made in the combination and arrangement of the parts illustrated, as will now likely appear to others and those skilled in the art. For a definition of the scope of limits of the invention, reference should be had to the appended claims.

What is claimed is:

1. A pneumatic linear pressure divider comprising a pair of spaced relatively slidable concentrically positioned outer and inner tubular members, each having a bore, said inner member being sealed at one end and open at the opposite end to provide an output control port and having an orifice formed intermediate its ends, said outer member having a bore larger than the outer diameter of said inner member to provide a clearance gap with an intake point and an exhaust point and having a pressure gradient throughout its extend between the bore of the first member and the outer diameter of the second member, and an input port connecting with the bore of said outer member connectable with a source of air or the like under pressure, said air input flowing into said gap at the intake point thereof between the members, through said orifice and the bore of said inner member to a suitable receiver to be pneumatically controlled according to the output control position of said orifice.

2. A pneumatic linear pressure divider for providing a variable pressure output from a constant input pressure source comprising a housing with an input connection to a source of constant pressure, an elongated tubular extension, having a bore, extending from said housing, and a tubular slider means, having a bore, concentrically positioned in the bore of said extension to provide a clearance gap with an inlet and an exhaust end, said slider means having an orifice intermediate the ends thereof connecting with said gap, to thereby permit air to be transmitted from different positions in said gap into the bore of said tubular slider means, said slider means being sealed at one end and open at the opposite end to provide a variable control output connection to a suitable receiving device.

3. A linear pressure divider for providing a variable pressure output from a constant pressure input source comprising a housing with an input connection to a source of constant pressure, an elongated tubular extension, having a bore, extending from said housing, and a tubular slider means, having a bore, concentrically positioned in the bore of said extension to provide a clearance gap with an inlet and an exhaust end, said slider means having an orifice intermediate the ends thereof connecting with said gap, to thereby permit air to be transmitted from different positions in said gap into the bore of said tubular slider means, said slider means being sealed at one end and open at the opposite end to provide a variable control output connection to a suitable receiving device, a connection point between said tubular extension and said housing, said point serving as a reference point for registering said slider means orifice with said input pressure and from which said slider orifice is movable to obtain a desired output pressure gradient to a suitable receiver.

4. A pneumatic linear pressure divider comprising a pair of spaced realtively slidable concentrically positioned outer and inner tubular members, each having a bore, said inner member being sealed at one end and open at the opposite end and having a pick-off orifice formed intermediate its ends, said outer member having a bore larger than the outer diameter of said inner member to provide a constant pressure gradient clearance gap with an input end and an exhaust end between the bore of the outer member and the outer diameter of the inner member, and a constant pressure source input port connection leading into the bore of said outer member at the input end of said gap, said constant pressure input source flowing into said gap between the members, through said orifice and the bore of said inner member and out of said open opposite output end thereof to a suitable receiver at an output pressure which is a function of the position of said pick-off orifice between the input end and the exhaust end of said gap.

5. A pneumatic linear pressure divider comprising a tubular T-coupling, having a bore, an elongated slider tube, having a bore, spaced concentrically therewith and extending through the bore of the tubular horizontal head portion of said T-coupling, to provide a clearance gap therebetween, said slider tube extending from each end of the T-head of the coupling into the atmosphere, said slider tube being sealed at one end and open at the opposite end to provide an output port, and a pick-off orifice communicating with said gap formed at a predetermined position in said slider tube, said orifice being movable from the juncture point of the said T-coupling as desired along the length of said gap, whereby a pressure gradient exists along said gap beginning at supply pressure into the vertical leg of said T-coupling and dropping to atmosphere at the open end of said T-head of the coupling.

6. A pneumatic linear pressure divider for changing a constant pressure input to a regulated output pressure comprising a first tubular member, having a bore, with an input connection to a source of input pressure, and a tubular slider means, having a bore and, having an outer diameter relatively smaller than the bore of said first tubular member positioned in the bore of said member to provide a clearance gap between the outer diameter of the said slider means and the bore of said first tubular member, said clearance gap having an input end and an exhaust end, said slider means having an orifice communicating with said gap intermediate the ends thereof, to thereby permit air to be transmitted from said gap defined in the bore of said first tubular member into the bore of said tubular slider means, said slider means being sealed at one end and open at the opposite end and extending beyond the end of the first member at said clearance gap exhaust end, said open end of said tubular slider means being connectable to a suitable receiving device, said first tubular member exhausting to atmosphere at the exhaust end of said clearance gap.

7. A linear pressure divider of fluid flow for changing a constant pressure input to a regulated output pressure comprising a first tubular member, having a bore, with an input connection to a source of input pressure, and a tubular slider means, having a bore, and having an outer diameter relatively smaller than the bore of said first tubular member positioned in the bore of said member to provide a clearance gap between the outer diameter of the said slider means and the bore of said first tubular member, said clearance gap having an input end and an annular exhaust end, said slider means having an orifice intermediate the ends thereof connecting with the clearance gap from the input end to the exhaust end, to thereby permit fluid to be transmitted from the start of said gap at the input end thereof to the exhaust end thereof into the bore of said tubular slider means, said slider means being sealed at one end and open at the opposite end and extending beyond the end of the first member for connection to a suitable receiving device, and said first tubular member opening to atmosphere at the exhaust end of said clearance gap, whereby there is a reference pressure point at the intake end of the clearance gap between said first tubular member and said tubular slider means, said point serving as the reference point for an input pressure from said source of input pressure at the clearance gap input end between said first tubular member and the outer diameter of said tubular slider means, said point serving as an input pressure reference starting point in the clearance gap for said slider means orifice to said clearance gap annular exhaust end, to thereby permit regulation of the ouput pressure gradient at the output end of the tubular slider means as the said slider orifice moves toward the clearance gap exhaust end.

References Cited in the file of this patent
UNITED STATES PATENTS

| | | |
|---|---|---|
| 1,980,085 | Perry et al. | Nov. 6, 1934 |
| 2,323,115 | Bryant | June 29, 1943 |